US012257464B1

(12) United States Patent
Amann et al.

(10) Patent No.: US 12,257,464 B1
(45) Date of Patent: Mar. 25, 2025

(54) FIRE PREVENTION WITH POSITIVE PRESSURE SYSTEM IN A BUILDING

(71) Applicant: UIPCO, LLC, San Antonio, TX (US)

(72) Inventors: Manfred Amann, San Antonio, TX (US); Justin Dax Haslam, San Antonio, TX (US); Ravi Durairaj, San Antonio, TX (US); Matthew Ryan Santacroce, Rio Rancho, NM (US); Snehal Desai, Richardson, TX (US); Eric David Schroeder, San Antonio, TX (US); Donnette L. Moncrief Brown, San Antonio, TX (US); Meredith Beveridge, Morrison, CO (US); Michael J. Maciolek, Kerrville, TX (US); Robert Wiseman Simpson, Fair Oaks Ranch, TX (US); Timothy Frank Davison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 554 days.

(21) Appl. No.: 17/511,667

(22) Filed: Oct. 27, 2021

Related U.S. Application Data

(60) Provisional application No. 63/105,996, filed on Oct. 27, 2020.

(51) Int. Cl.
*A62C 3/02* (2006.01)
*A62C 37/36* (2006.01)

(52) U.S. Cl.
CPC .......... *A62C 3/0214* (2013.01); *A62C 3/0207* (2013.01); *A62C 37/36* (2013.01)

(58) Field of Classification Search
CPC ...... A62C 3/0214; A62C 3/0207; A62C 37/36
See application file for complete search history.

(56) References Cited

U.S. PATENT DOCUMENTS 6,434,969 B1 * 8/2002 Sosnowski ................ F24D 5/12 62/426
9,322,568 B2 * 4/2016 Aycock ................ F24F 11/0001
10,371,408 B2 * 8/2019 Papas ........................ F24F 11/89
2003/0190885 A1 * 10/2003 Johnsons, Jr. .......... F24F 7/065 454/186
2007/0072541 A1 * 3/2007 Daniels, II ............... F24F 11/70 454/365
2020/0408428 A1 * 12/2020 Smith ................. F24F 13/1406

* cited by examiner

*Primary Examiner* — Allen R. B. Schult
(74) *Attorney, Agent, or Firm* — Plumsea Law Group, LLC

(57) ABSTRACT

A fire prevention system for a building. The fire protection system has an inlet duct having an interior end and an exterior end. An air handler is disposed at the interior end of the inlet duct to provide air from outside the building to the air handler. A flame arrester is located at the exterior end of the inlet duct to prevent burning embers from entering the inlet duct. The fire protection system also includes an interior duct system for distributing air from the air handler through the building. Distribution vents in the interior duct system allow flow of air from the interior duct system to the interior of the building to raise the pressure in the building above the outside pressure. Exhaust vents to allow flow of air out of the building. Also, a method for fire prevention for a building exposed to a fire.

18 Claims, 6 Drawing Sheets

FIRE PREVENTION WITH POSITIVE PRESSURE SYSTEM IN A BUILDING

CROSS-REFERENCE TO RELATED APPLICATIONS

This application claims the benefit of U.S. Provisional Patent Application Ser. No. 63/105,996, filed Oct. 27, 2020, and titled "Fire Prevention With Positive Pressure System In A Building," the entirety of which is hereby incorporated by reference.

BACKGROUND

1. Field of the Disclosure

The present disclosure relates to a system for preventing fire in a building. In particular, the disclosure relates to a positive pressure system for preventing fire in a building. The disclosure also relates to a method for preventing fire in a building.

2. Description of Related Art

Destruction of buildings by fire from the outside is becoming more prevalent. The number of wild fires per year is increasing as people make greater use of developed and undeveloped areas of natural spaces. Both business, such as forestry, and personal use, such as hunting and camping, contribute to the number of fires used in such outdoor spaces. With an increase in the number of users comes additional pressures upon the land, not only by increased fire risk, but also by increased numbers of less-well trained and inexperienced users. Increased pressure on use makes even a small fire a dangerous one.

Global warming also contributes to the danger of fires in outdoor spaces by drying the fuel sources and strengthening of storm winds, thus increasing the intensity of a fire. Wild fires tend to burn hotter, sending embers high into the wind. Thus, embers are transported farther than they have been in the past, and are distributed into a larger area. As these hotter embers and smoke are carried further, they impinge upon more and more inhabited areas. Denser habitation means denser building, and more chance of building fires.

Defense against wild fires is difficult. Many such fires burn in areas devoid of roads. Further, such natural spaces often are devoid of on-demand water sources, such as hydrants, and there often are but few people present to fight a fire. Many structures are uninhabited for months at a time. Also, such fires may burn undetected, and so become well-established and difficult to extinguish.

Further, the close proximity of buildings in urban and suburban regions increases the likelihood that a structure fire will spread from one building to another. Just as embers may spread a wild fire, embers may spread from one structure fire to another.

There is a need in the art for a system and method that addresses the shortcomings of the prior art discussed above.

SUMMARY OF THE DISCLOSURE

In one aspect, the disclosure provides a fire prevention system for a building. The fire protection system comprises an inlet duct having an interior end and an exterior end. An air handler is disposed at the interior end of the inlet duct, which is adapted for providing air from outside the building to the air handler. A flame arrester is disposed at the exterior end of the inlet duct to prevent burning embers from entering the inlet duct.

The fire protection system also includes an interior duct system for distributing air from the air handler through the building. Distribution vents in the interior duct system allow flow of air from the interior duct system to the interior of the building to raise the pressure in the building above the outside pressure. Exhaust vents allow flow of air out of the building.

In another aspect, the disclosure provides a method for fire prevention for a building exposed to a fire. In accordance with the method, exterior airflow is received at a flame arrester when a fire hazard is detected. The exterior airflow is passed through the flame arrester to prevent passage of embers into an interior air handler in the building. The exterior airflow is pressurized in the air handler to deliver pressurized air in the interior of the building. The pressurized air is distributed through an interior duct system, which serves as distribution conduits into the building to raise the pressure in the building above the exterior pressure, and the pressurized air is directed out of the building through exhaust vents to blow embers away from the building.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Fires often generate embers that become caught in air currents in the vicinity of a fire and may be easily blown from one location to another. For example, a wildfire may blow embers from one area of a forest to another. Any buildings within the area may be at risk of an ember landing on the roof or lodging in siding, on a windowsill, or another location on the structure. Embers also may be transferred from one building to another. Thus, there may be a need to suppress or minimize the chance of fire on the structure.

The disclosure is directed to a system and method for protecting a building or a structure against fire from an ember landing on the roof of the structure or becoming lodged on a windowsill or in the siding of the building, for example. The fire may be a wildfire or a fire in a nearby building.

Figure 1:
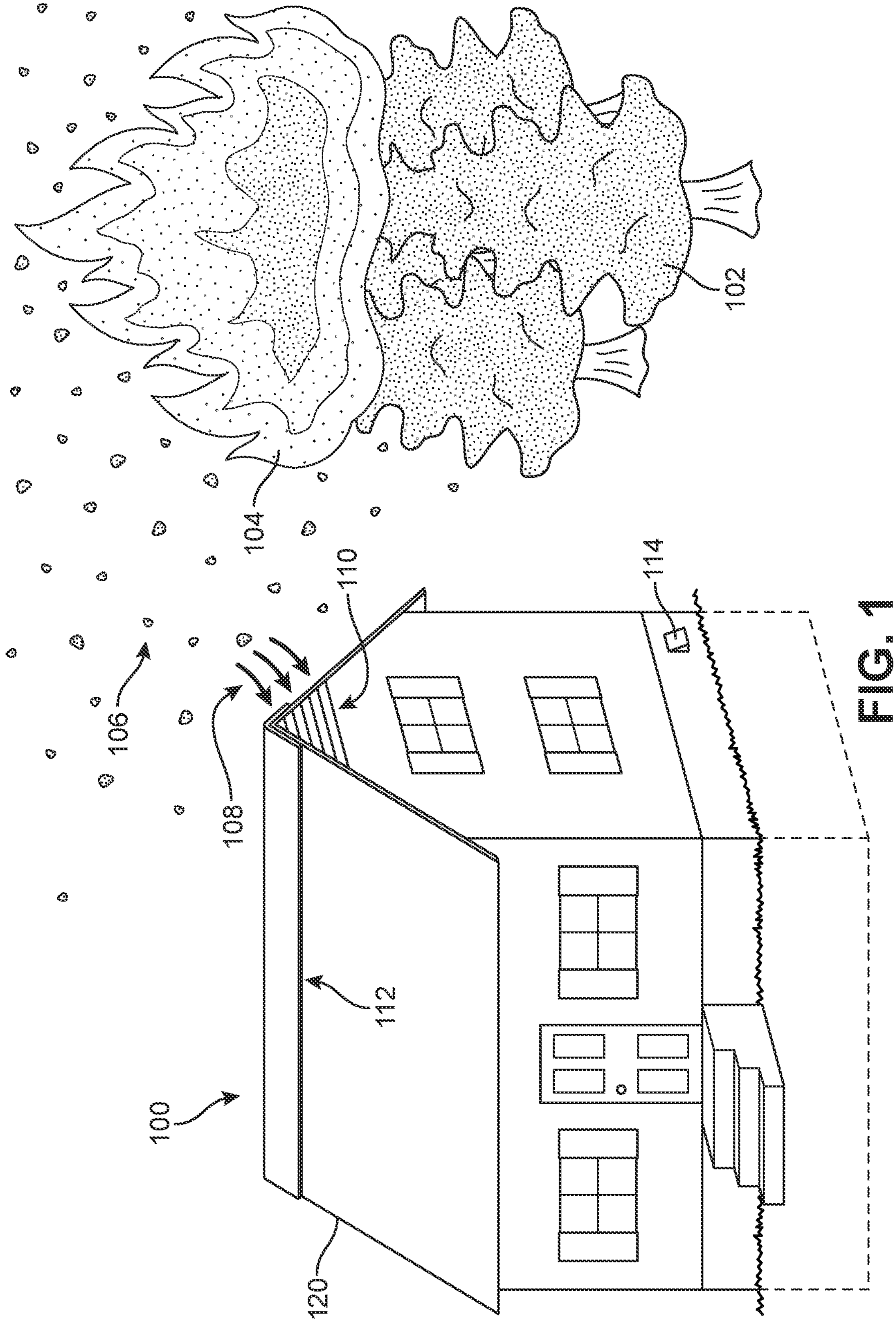
FIG. 1 is a depiction of a fire near a structure.

FIG. 1 illustrates an embodiment of the disclosure, wherein building 100 is at risk of an ember 106 moving toward the building in the direction of direction arrows 108 from fire 104 in tree 102. Building 100 may have gable vents 110, ridge vent 112, or both. Air may flow in either direction, that is, into or out of, building 100, through these vents when the fire protection system is not being used to pressurize building 100. For example, wind may blow into the vent, or air may flow due to differences between inside and outside temperatures. Building 100 also includes dryer vent 114, which typically includes a check valve that prevents exterior airflow from entering into building 100.

Figure 2:
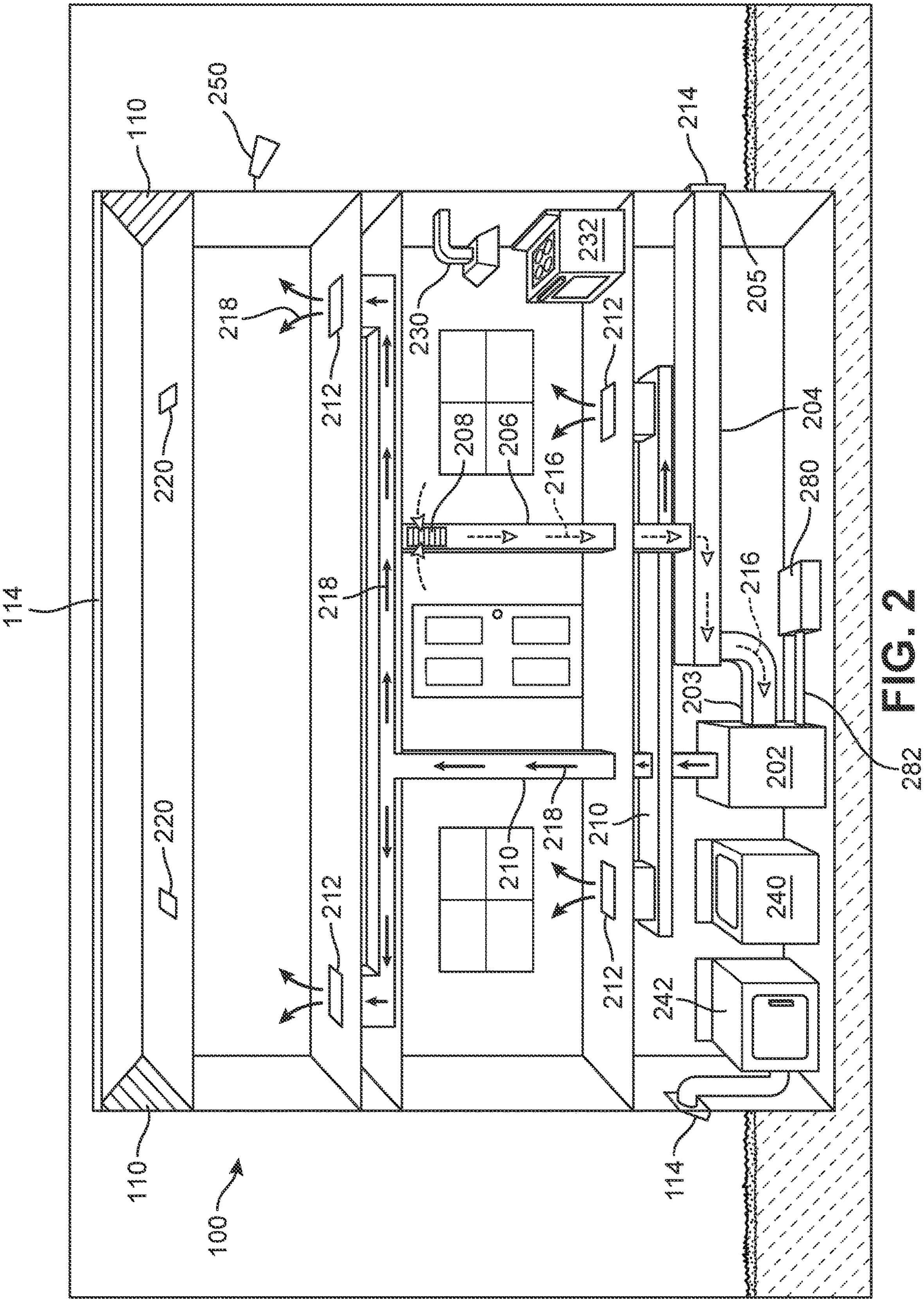
FIG. 2 is a cut-away schematic illustration of an embodiment of the disclosure.
Figure 3:
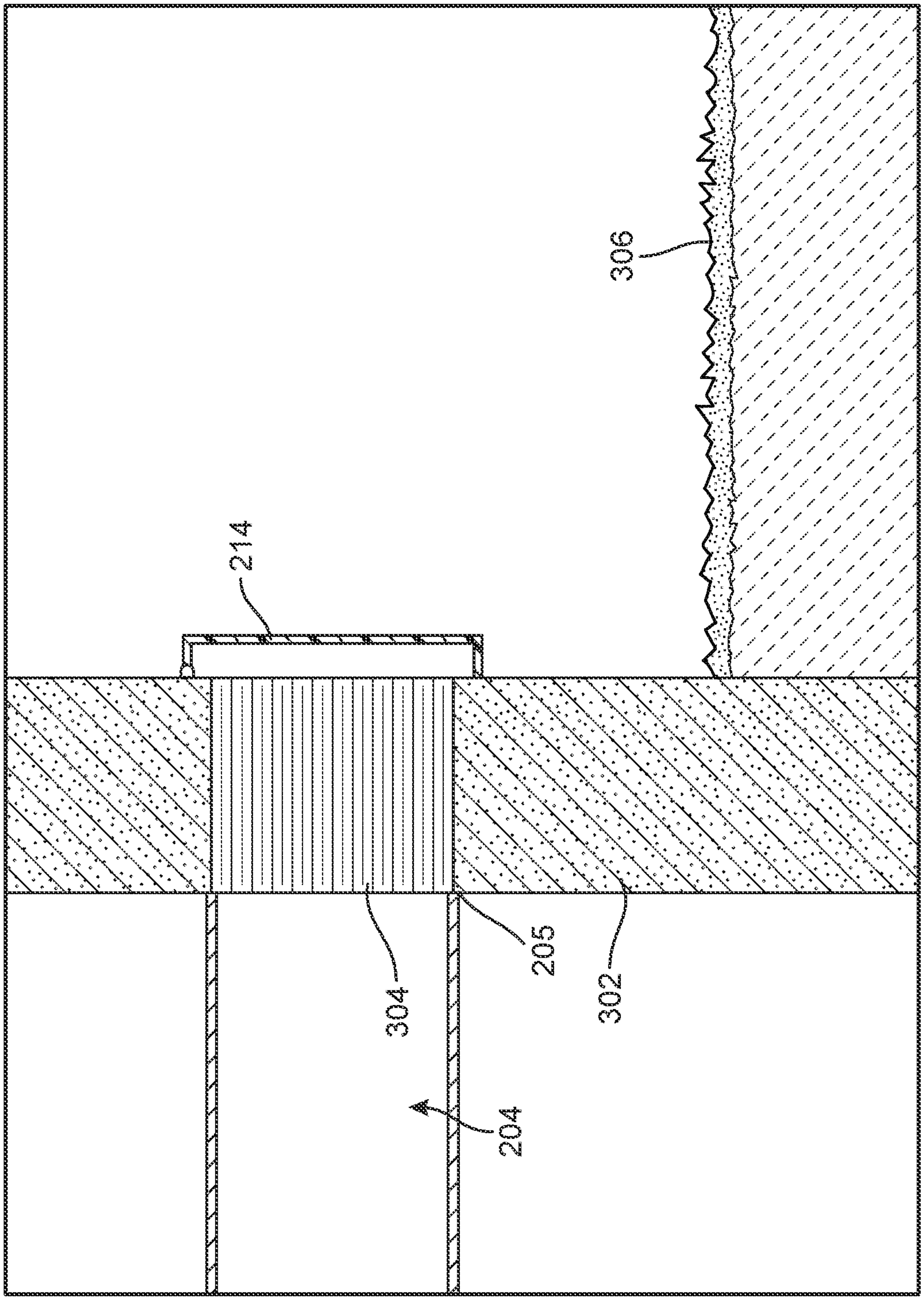
FIG. 3 is a schematic illustration of a portion of an embodiment of the disclosure.
Figure 4:
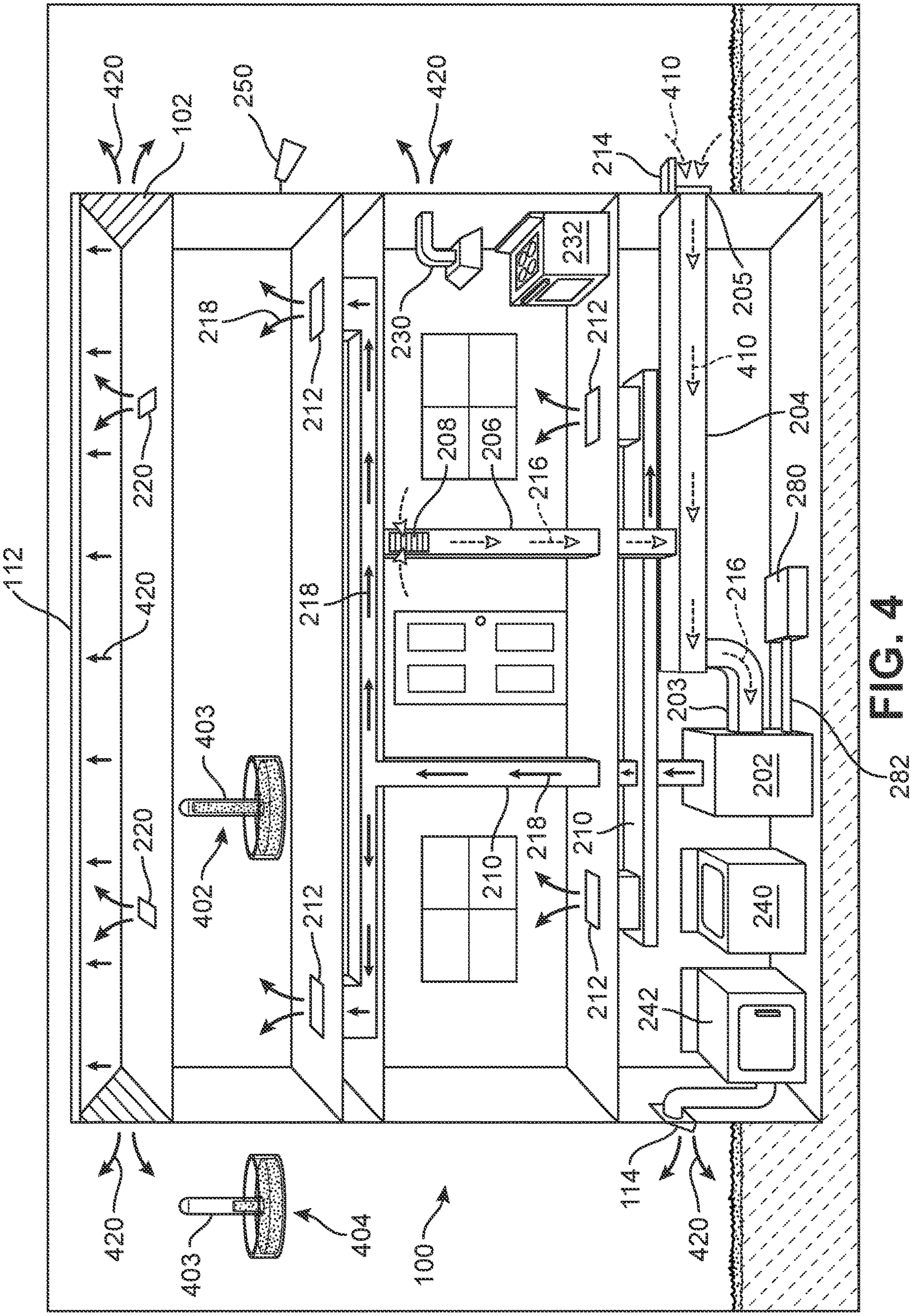
FIG. 4 is a schematic illustration of air flow in an embodiment of the fire protection system of the disclosure in operation.

Thus, the disclosure is directed to a fire prevention system for a building. An embodiment of the disclosure is illustrated in FIG. 2, FIG. 3, and FIG. 4. FIG. 2 illustrates a cut away view of the interior of building 100 so that an embodiment of the fire protection system disclosed herein may be illustrated. Building 100 has four interior levels, but an embodiment of a fire protection system disclosed herein may be used in a building having any number of levels. FIG. 3 illustrates a schematic diagram of flame arrester 304 in wall 302. Wall 302 may be a wall of the foundation of the house. FIG. 4 is a cut away view of fire protection system in building 100 in operation. FIG. 4 illustrates an embodiment of a fire protection system such as that of FIG. 2 in operation.

FIG. 2 illustrates an embodiment of the structure of a fire protection system disclosed herein. In FIG. 2, inlet duct cover 214 is closed. Air handler 202 moves air in the building with the pressure in the building essentially the same as the pressure outside the building. Small amounts of air may flow around doors or around windows, as described below.

FIG. 4 illustrates an embodiment in which exterior airflow 410 is delivered to air handler 202, which is used to increase pressure of interior airflow 218 in building 100 so that exhaust vent airflow 420 becomes sufficient to blow embers away from building 100, and particularly from the roof and sides of building 100. The pressure in building 100 is indicated on interior barometer 402, and the pressure outside building 100 is indicated on exterior barometer 404. In the barometers, the fluid level in the vertical fluid tube 403 goes up as pressure goes up. As can be seen, the pressure inside building 100 is greater than the pressure outside building 100. In operation, exhaust vent airflow 420 is related to the pressure difference produced by air handler 202. In some embodiments, therefore, the pressure difference is established to yield exhaust vent airflow 420 at a velocity sufficient to remove a few small embers. In some embodiments, the pressure difference is established yield a velocity of exhaust vent airflow 420 sufficient to blow several large embers off the roof.

An embodiment of the disclosure includes inlet duct 204 having interior end 203 and exterior end 205. Air handler 202 is disposed at interior end 203 of inlet duct 204. Inlet duct 204 provides exterior airflow 410 (see FIG. 4) from outside the building to air handler 202. As shown in FIG. 2 and FIG. 3, inlet duct cover 214 may be closed to prevent entry of exterior airflow 410 into inlet duct 204. Inlet duct cover 214 also tends to keep animals away from the duct and flame arrester 304. When closed, inlet duct cover 214 is opened, as shown in FIG. 4, when exterior airflow 410 is required.

In embodiments, flame arrester 304 (or, alternatively, "flame arrestor") is disposed at the exterior end 205 of inlet duct 204, as shown in FIG. 3. Flame arrester 304 prevents burning embers from entering the inlet duct 204 with exterior airflow 410, as described in additional detail below. Flame arrester 304 also may be known as a flame trap or a deflagration arrester. Flame arrester 304 not only physically prevents embers from entering inlet duct 204 at exterior end 205, but also allows exterior airflow 410 to pass through without carrying a flame into inlet duct 204.

In embodiments of the disclosure, an interior duct system is used to distribute air from an air handler through the building. As shown in FIG. 2 and FIG. 4, the interior duct system includes inlet duct 204, supply duct 210, and interior return duct 206. In particular, in the embodiment illustrated in FIG. 2 and FIG. 4, air handler 202 receives exterior airflow 410 and return airflow 216 and introduces the combined airflow to air handler 202 at interior end 203 of inlet duct 204. Return airflow 216 recycles to air handler 202 any pressurized air that does not flow out of the building.

In some embodiments, supply duct 210 serves to direct interior airflow 218 throughout the interior of building 100. Return airflow 216 is directed through interior return duct 206 to inlet duct 204. Also, embodiments may include fire sensor 250 mounted on the side of building 100 or on roof 120 of building 100.

In embodiments of the disclosure, interior airflow 218 is introduced to the entire volume of building 100 through distribution vents 212 on the interior duct system to allow flow of interior airflow 218 from the interior duct system to the interior of the building. The flow of interior airflow 218 through building 100 raises the pressure in the building above the outside pressure. Interior airflow 218 also may flow through ceiling vents 220 into an area where gable vents 110 and ridge vent 112 may be accessed.

In embodiments of the disclosure, exhaust vents allow interior airflow 218 out of building 100. In some embodiments, gable vents 110 may serve to direct exhaust vent airflow 420 to the area near roof 120. In some embodiments, ridge vent 112 may serve to direct exhaust vent airflow 420 directly onto the surface of roof 120 at ridge vent 112 so that the exhaust vent airflow 420 tends to blow embers downward and off of roof 120.

In some embodiments, vents that are part of building 100 also serve to allow exhaust vent airflow 420 to blow embers away from the building. For example, a building may have washer 240 and dryer 242, often in the lowest level of the building, as illustrated in FIG. 2 and FIG. 4. Thus, in some embodiments, dryer vent 114 for dryer 242 serves to direct exhaust vent airflow 420 out of building 100 near the ground to blow embers away from the side of building 100. This airflow tends to keep embers away from lower levels of the building and may serve to reduce fire near the foundation. Dryer vent 114 may be located elsewhere and still provide airflow that protects some part of building 100, such as the side or the roof, if dryer is placed on a higher level. Similarly, stove 232 may have a kitchen exhaust duct 230 associated therewith. Kitchen exhaust duct 230 directs exhaust vent airflow 420, and hence embers, away from the side of the building or off window sills, for example. Bathrooms may have similar exhaust ducts. Exhaust vent airflow 420 also may flow out of the building through air leaks, such as around windows, around doors, and the like.

In embodiments of the disclosure, interior airflow 218 that does not flow out of the building as exhaust vent airflow 420 may return to air handler 202 by way of interior return duct 206. Return airflow 216 may enter interior return duct 206 through interior return vent 208. In some embodiments, return airflow 216 then flows through interior return duct 206 to inlet duct 204. In some embodiments, return airflow 216 may be returned directly to air handler 202.

Figure 5:
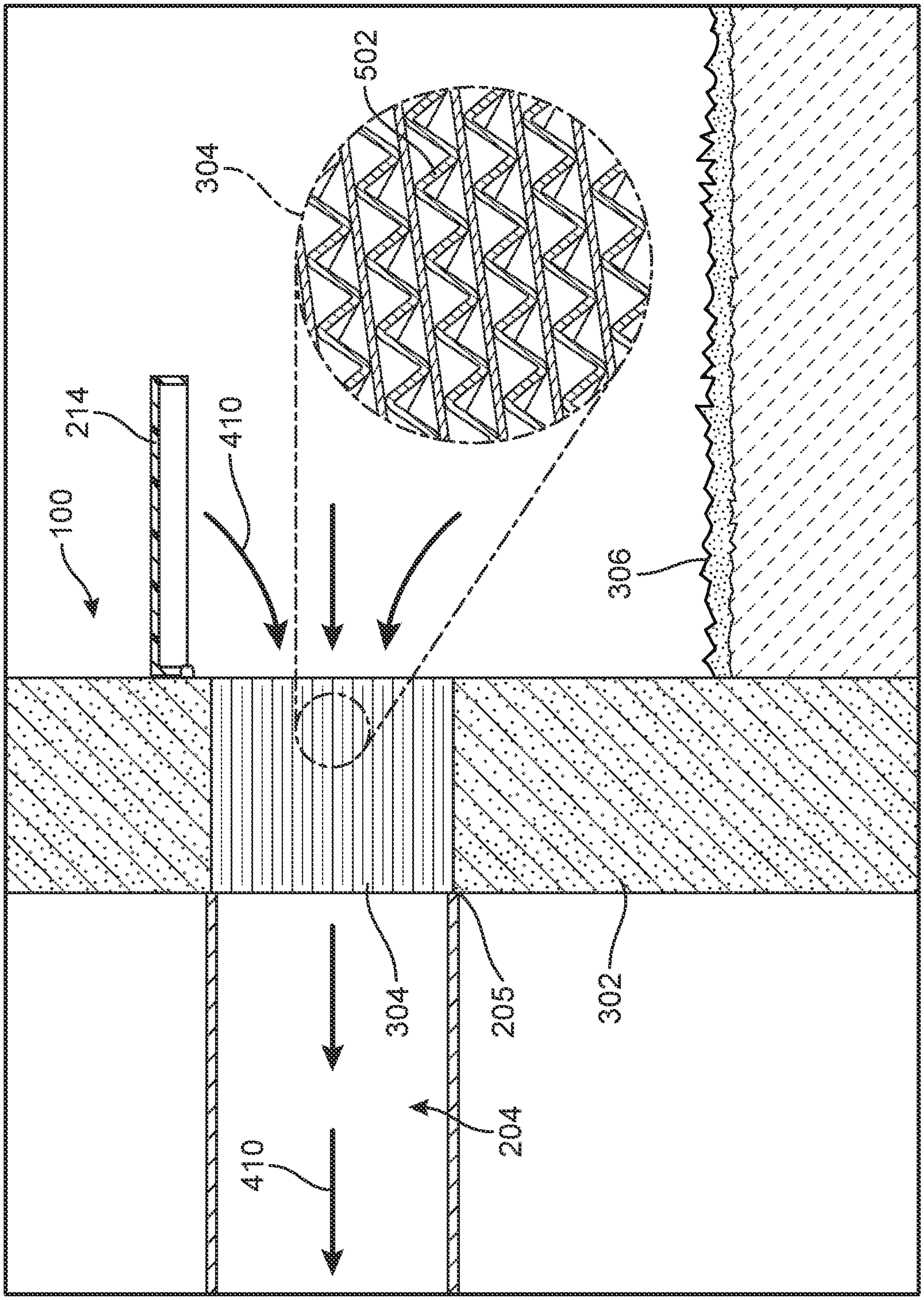
FIG. 5 is a schematic view of details of an embodiment of the disclosure.

Turning now to FIG. 3 and FIG. 5, in some embodiments, flame arrester 304 may be located in foundation wall 302 of building 100 above ground level 306. Flame arrester 304 is disposed at exterior end 205 of inlet duct 204 to preclude flame and burning embers from entering inlet duct 204. Location of flame arrester 304 near ground 306 helps to reduce the number of embers that enter flame arrester 304.

As illustrated in FIG. 3, in some embodiments, inlet duct cover 214 covers exterior end 205 of inlet duct 204 when the fire protection system is not used to pressurize building 100. When closed, inlet duct cover 214 prevents entry of debris, insects, and animals into the fire protection system.

As illustrated in FIG. 5, in some embodiments, when exterior airflow is required for the fire protection system to pressurize building 100, inlet duct cover 214 is opened. With inlet duct cover 214 open, exterior airflow 410 flows through flame arrester 304 into interior duct 204 at exterior end 205. Inlet duct cover 214 may be opened manually, but, in some embodiments, is opened upon command of the hazard detection system described below.

Flame arrester 304 may be constructed in any manner that removes heat from an ember sufficient to preclude continued burning as the ember attempts to travel through the flame arrester. Flame arrester 304 typically comprises small apertures opening to longitudinal passageways having walls made of metal or other heat-conducting compositions. A typical construction includes a crimped metal ribbon-type element 502. The element may comprise parallel sheets, as shown in FIG. 5. Alternate arrangements, such as spiral format, may be used. In embodiments, any construction that precludes flame from entering inlet duct 204 may be used.

In some embodiments, the fire protection system includes hazard detection system 280. Hazard detection system 280 may communicate with air handler 202 through hazard detection system connector 282, as shown in FIG. 2 and FIG. 4. Hazard detection system 280 may include a receiver for receiving electronic messages delivered to hazard detection system 280, such as weather-related information, including predicted and actual temperature, wind speed, likelihood of precipitation, and type of fire, for example. Weather alerts, emergency broadcasts, fire sensors, and reports from the locality or from adjacent localities also may be useful and received from various existing warning systems. Information may be broadcast to or otherwise delivered to a broadcast receiver in the hazard detection system.

In some embodiments, therefore, hazard detection system 280 may be autonomous. Such operation may be particularly convenient when the building is unattended or vacant, or when personnel authorized to operate the roof protecting system are not present. In such circumstances, the autonomous control system may be adapted to receive information from weather alerts and broadcasts, system fire sensors, neighboring systems, and reports of the location and severity of fire. Any relevant information useful in determining whether to deploy hazard detection system 280 may be considered.

In some embodiments, hazard detection system 280 may be manually operable. Manual operation may be available on site, or may be available remotely. Manual operation may be used to operate the hazard detection system if the autonomous system has not operated air handler 202 and opened inlet duct cover 214 when required. Manual operation may be used to test the system. Manual operation also may be used to stop the fire protection system from deploying under selected circumstances, such as error in automatic start, fire within the fire protection system, significant damage to the roof, failure to open inlet duct cover 214, or other faults.

Figure 6:
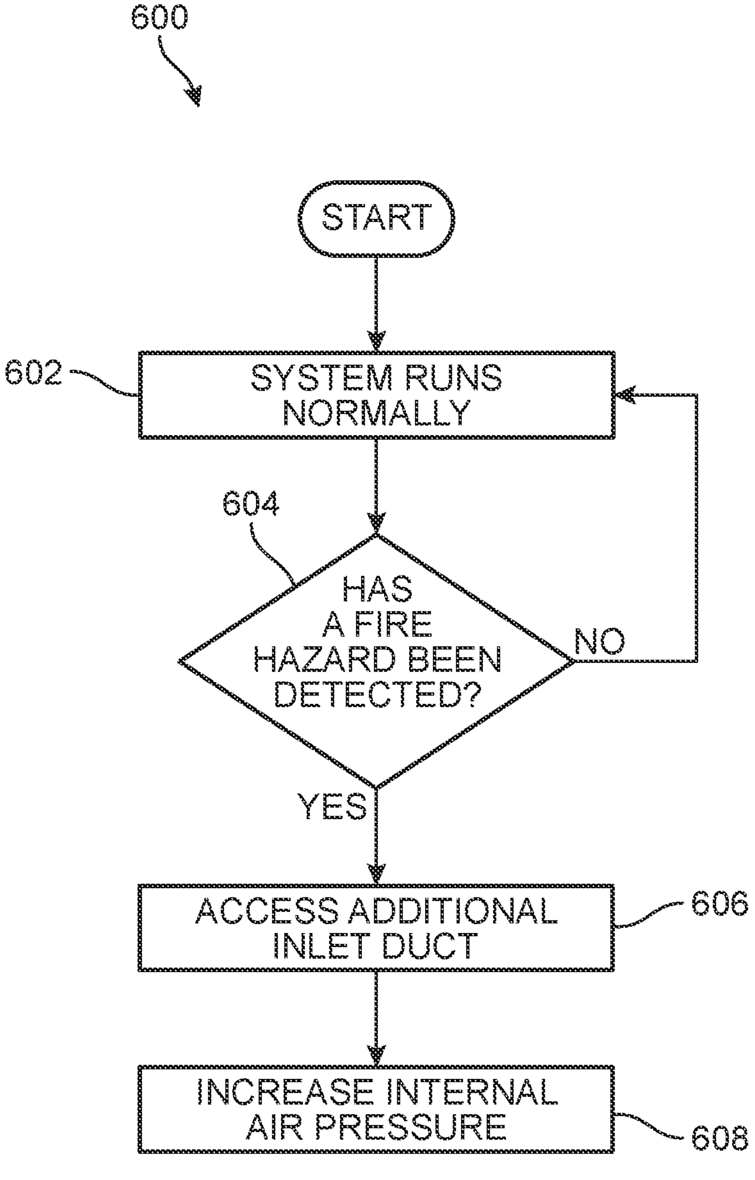
FIG. 6 is a schematic diagram of operation of an embodiment of the disclosure.

FIG. 6 is a flow diagram for a method of operating the system. As set forth in FIG. 6, in some embodiments, at step 602 of process 600, the fire protection system operates in a normal mode, without intake of exterior air, as illustrated in FIG. 2. The fire protection system continues to operate in normal mode until a fire is detected at step 604. When a fire has been detected, such as by a flame detector 250, the fire protection system operates in fire protection mode. In fire protection mode, step 606 calls for accessing the inlet duct, which requires opening of inlet duct cover 214 to allow exterior airflow into the system through the flame arrester at exterior end 203 of inlet duct 204 arrester to prevent passage of embers into an interior air handler in the building. Then, at step 608, the exterior airflow in air handler 202 is used to increase pressure in the interior of the building. The pressure difference between interior barometer 402 and exterior barometer 404 may be used to confirm that the desired pressure difference has been achieved. Pressurized interior airflow 218 then is distributed through distribution conduits, such as supply duct 210, into the building to raise the pressure in the building above the exterior pressure. The pressurized air is directed out of the building through exhaust vents, such as gable vents 110, ridge vent 112, dryer vent 114, and kitchen exhaust duct 230, to blow embers away from the building.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A fire prevention system for a building, the fire protection system comprising:
- an inlet duct having an interior end and an exterior end;
- an air handler disposed at the interior end of the inlet duct, wherein the inlet duct is adapted for providing air from outside the building to the air handler;
- a flame arrester disposed at the exterior end of the inlet duct, wherein the flame arrester prevents burning embers from entering the inlet duct;
- an interior duct system for distributing air from the air handler through the building;
- distribution vents in the interior duct system to allow flow of air from the interior duct system to the interior of the building to raise an interior pressure in the building above an outside pressure; and
- a plurality of exhaust vents to allow flow of air out of the interior of the building at a plurality of locations around an exterior of the building, wherein the plurality of exhaust vents are located at least at a roof of the building, a first side of the building, and a second side of the building;
- wherein the inlet duct includes an inlet duct cover which is configured to reversibly move from a closed position to an open position upon the fire protection system receiving a signal from a fire hazard detection system.

2. The fire protection system of claim 1, wherein at least one exhaust vent is in the roof of the building and is adapted to blow embers away from the roof of the building.

3. The fire protection system of claim 2, wherein the at least one exhaust vent is a ridge vent.

4. The fire protection system of claim 1, wherein at least one exhaust vent is a gable vent.

5. The fire protection system of claim 1, wherein at least one exhaust vent is a range vent or a dryer vent.

6. The fire protection system of claim 1, wherein the building has multiple levels and the fire protection system further comprises at least one distribution vent on each level.

7. The fire protection system of claim 1, wherein the interior duct system further comprises an interior return duct and vent to return air to the air handler.

8. The fire protection system of claim 1, wherein the flame arrester is located in a wall of the lowest level of the building to minimize the number of burning embers entering the flame arrester.

9. The fire protection system of claim 1, further comprising an interior barometer and an exterior barometer.

10. The fire protection system of claim 1, wherein the fire hazard detection system is configured to determine whether to operate the fire protection system.

11. The fire protection system of claim 10, wherein the fire hazard detection system comprises fire sensors.

12. The fire protection system of claim 10, wherein the fire hazard detection system comprises a receiver for messages from a warning system.

13. The fire protection system of claim 1, wherein the fire protection system increases the interior pressure to a pressure greater than the exterior pressure sufficient to blow embers away from the roof of the building; and the fire protection system increases the interior pressure to a pressure greater than the exterior pressure sufficient to blow embers away from a wall of the building.

14. A fire prevention system for a building, the fire protection system comprising:

an inlet duct having an interior end and an exterior end;

an air handler disposed at the interior end of the inlet duct, wherein the inlet duct is adapted for providing air from outside the building to the air handler;

a flame arrester disposed at the exterior end of the inlet duct, wherein the flame arrester prevents burning embers from entering the inlet duct;

an interior duct system for distributing air from the air handler through the building;

distribution vents in the interior duct system to allow flow of air from the interior duct system to the interior of the building to raise an interior pressure in the building above an outside pressure; and a plurality of exhaust vents to allow flow of air out of the interior of the building at a plurality locations around an exterior of the building, wherein the plurality of exhaust vents are located at least at a roof of the building, a first side of the building, and a second side of the building;

wherein the building has multiple levels and the fire protection system further comprises at least one distribution vent on each level; and wherein the flame arrester is located in a wall of a lowest level of the building out of the multiple levels, so as to minimize the number of burning embers entering the flame arrester;

wherein the inlet duct includes an inlet duct cover which is configured to reversibly move from a closed position to an open position upon the fire protection system receiving a signal from a fire hazard detection system.

15. The fire protection system of claim 14, wherein the fire hazard detection system comprises fire sensors.

16. The fire protection system of claim 14, wherein the fire hazard detection system comprises a receiver for messages from a warning system.

17. The fire protection system of claim 14, wherein the fire protection system increases the interior pressure to a pressure greater than the exterior pressure sufficient to blow embers away from the roof of the building; and wherein fire protection system increases the interior pressure to a pressure greater than the exterior pressure sufficient to blow embers away from a wall of the building.

18. The fire protection system of claim 14, wherein the building has four levels, and includes at least one distribution vent on each of the four levels.

* * * * *